United States Patent
Baldemair et al.

(10) Patent No.: US 12,375,934 B2
(45) Date of Patent: Jul. 29, 2025

(54) NETWORK NODE AND METHOD FOR DYNAMIC SPECTRUM SHARING BETWEEN RADIO ACCESS TECHNOLOGIES

(71) Applicant: Telefonaktiebolaget LM Ericsson (publ), Stockholm (SE)

(72) Inventors: Robert Baldemair, Solna (SE); Håkan Björkegren, Täby (SE); Rui Fan, Beijing (CN); Oskar Mauritz, Johanneshov (SE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 455 days.

(21) Appl. No.: 17/439,458

(22) PCT Filed: Mar. 10, 2020

(86) PCT No.: PCT/SE2020/050262
§ 371 (c)(1),
(2) Date: Sep. 15, 2021

(87) PCT Pub. No.: WO2020/190195
PCT Pub. Date: Sep. 24, 2020

(65) Prior Publication Data
US 2022/0182842 A1    Jun. 9, 2022

(30) Foreign Application Priority Data
Mar. 15, 2019  (WO) ............... PCT/CN2019/078338

(51) Int. Cl.
*H04L 12/00* (2006.01)
*H04W 16/14* (2009.01)
(Continued)

(52) U.S. Cl.
CPC ....... *H04W 16/14* (2013.01); *H04W 72/0453* (2013.01); *H04W 88/06* (2013.01)

(58) Field of Classification Search
CPC ............. H04W 16/14; H04W 72/0453; H04W 88/06
See application file for complete search history.

(56) References Cited

U.S. PATENT DOCUMENTS

| 2018/0070369 A1 | 3/2018 | Papasakellariou |
| 2019/0037579 A1* | 1/2019 | Yi ......................... H04L 5/0098 |
| 2019/0357264 A1* | 11/2019 | Yi ......................... H04L 1/1819 |

(Continued)

FOREIGN PATENT DOCUMENTS

| WO | 2017173133 A1 | 10/2017 |
| WO | 2017183926 A1 | 10/2017 |
| WO | 2019013564 A1 | 1/2019 |

OTHER PUBLICATIONS

Ericsson, et al., "R3-181284: LTE-NR resource allocation coordination over X2," 3GPP TSG RAN WG3 Meeting #99, Feb. 26-Mar. 1, 2018, Athens, Greece, 6 pages.

(Continued)

*Primary Examiner* — Noel R Beharry
*Assistant Examiner* — Lionel Preval
(74) *Attorney, Agent, or Firm* — Withrow & Terranova, PLLC

(57) ABSTRACT

A method performed in a network node for configuring UE with dynamic spectrum sharing between a first RAT and a second RAT in a wireless communications system is disclosed. The network node configures an initial bandwidth part, BWP, for a UE, spanning across a dedicated spectrum for the first RAT and a shared spectrum between the first and second RATs, wherein synchronization signals of the first RAT are configured in the dedicated spectrum, and at least (Continued)

• Change in scheduler resources some other signals of the first RAT are configured in both dedicated and shared spectrum. The first RAT is NR and the second RAT is LTE.

15 Claims, 10 Drawing Sheets

(51) Int. Cl.
*H04W 72/0453* (2023.01)
*H04W 88/06* (2009.01)

(56) References Cited

U.S. PATENT DOCUMENTS

| | | | |
|---|---|---|---|
| 2020/0067676 A1* | 2/2020 | Yi | H04W 72/0446 |
| 2020/0245153 A1* | 7/2020 | Jones | H04W 12/08 |
| 2021/0227607 A1* | 7/2021 | Onaka | H04W 76/16 |

OTHER PUBLICATIONS

Samsung, "R1-164020: Co-existence of LTE and NR," 3GPP TSG RAN WG1 #85, May 23-27, 2016, Nanjing, China, 4 pages.
Extended European Search Report for European Patent Application No. 20772931.0, mailed Dec. 2, 2022, 8 pages.
Maximov, Sergey, et al., "5G NR and 4G LTE Coexistence: A Comprehensive Deployment Guide to Dynamic Spectrum Sharing; White Paper," Mediatek, Inc., 2020, 30 pages.
Samsung, "R2-1818068: Discussion on multiple active BWP support in NR-U," Third Generation Partnership Project (3GPP), TSG-RAN WG2 #103bis, Nov. 12-16, 2018, 2 pages, Spokane, USA.
International Search Report and Written Opinion for International Patent Application No. PCT/SE2020/050262, mailed May 29, 2020, 13 pages.
Examination Report for European Patent Application No. 20772931.0, mailed Apr. 11, 2025, 6 pages.

* cited by examiner

- Change in scheduler resources

- Change in scheduler resources

910. Configure an initial BWP, to be a combination of a dedicated spectrum for the first RAT and a shared spectrum between the first and second RATs

Fig. 9

NETWORK NODE AND METHOD FOR DYNAMIC SPECTRUM SHARING BETWEEN RADIO ACCESS TECHNOLOGIES

This application is a 35 U.S.C. § 371 national phase filing of International Application No. PCT/SE2020/050262, filed Mar. 10, 2020, which claims priority to International Application No. PCT/CN2019/078338, filed Mar. 15, 2019, the disclosures of which are incorporated herein by reference in their entireties.

TECHNICAL FIELD

Embodiments herein relate to a network node and method therein. In particular, they relate to dynamic spectrum sharing between radio access technologies in a wireless communication system.

BACKGROUND

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network or Long Term Evolution (LTE), have been completed within the 3rd Generation Partnership Project (3GPP) and this work continues in the coming 3GPP releases, for example to specify a Fifth Generation (5G) New Radio (NR) network.

The 5G or NR mobile wireless communication system supports a diverse set of use cases and a diverse set of deployment scenarios. The latter includes deployment at both low frequencies e.g. 100s of MHz, similar to LTE today, and very high frequencies e.g. millimetre waves in the tens of GHz.

Similar to LTE, NR uses Orthogonal Frequency-Division Multiplexing (OFDM) in both downlink, i.e. from a network node, gNB, eNB, or base station, to a User Equipment (UE), and in uplink, i.e. from UE to gNB, where both Discrete Fourier Transform spread OFDM (DFT-spread OFDM) and OFDM are supported.

The basic NR physical resource can thus be seen as a time-frequency grid similar to the one in LTE as illustrated in FIG. 1, where each resource element corresponds to one OFDM subcarrier during one OFDM symbol interval. Although a subcarrier spacing of $\Delta f=15$ kHz is shown in FIG. 1, different subcarrier spacing values are supported in NR. The supported subcarrier spacing values also referred to as different numerologies in NR are given by $\Delta f=(15 \times 2^\mu)$ kHz where $\mu$ is a non-negative integer.

Furthermore, the resource allocation in LTE is typically described in terms of Resource Blocks (RBs), where a resource block corresponds to one slot, 0.5 ms in the time domain and 12 contiguous subcarriers in the frequency domain. Resource blocks are numbered in the frequency domain, starting with 0 from one end of the carrier. For NR, a resource block is also 12 subcarriers in frequency but has no extension in time.

In the time domain, downlink and uplink transmissions in NR will be organized into equally-sized slots, similar to LTE subframes as shown in FIG. 2. In NR, the slot length for a reference numerology of $(15 \times 2^\mu)$ kHz is $\frac{1}{2^\mu}$ ms.

Downlink transmissions are dynamically scheduled, i.e., in each slot the gNB transmits Downlink Control Information (DCI) about which UE data is to be transmitted to and which resource blocks in the current downlink slot the data is transmitted on.

Reference Signal (RS) and Control Channel in LTE

In LTE, the Cell-specific Reference Signal (CRS) positions in DL subframes are dense and occupy resource elements in symbols with indices 0, 4, 7 and 11 within a subframe when 2 CRS ports are configured, denoted as LTE CRS port 0 and 1. In case 4 CRS ports are configured, the CRS occupy symbols with indices 0, 1, 4, 7, 8 and 11 within a subframe. However, in the case with 4 ports being configured, the third and fourth port, CRS port 2 and 3, are only used when receiving Physical Downlink Shared Channel (PDSCH) and not for mobility measurements as these measurements are defined on LTE port 0 and 1 only.

In LTE, up to 6 out of 10 subframes in a radio frame can be configured as Multimedia Broadcast multicast Service Single Frequency Network (MBSFN) subframes. In such subframes the CRS is only transmitted in the first two symbols in the subframe and if nothing is scheduled, the remainder of the subframe is empty.

FIG. 3 shows LTE CRS positions. Physical Downlink Control Channel (PDCCH) in LTE is used to convey the control information in downlink. It is located within the first 3 OFDM symbols in each subframe and spans all the bandwidth.

Similarly, Physical Uplink Control Channel (PUCCH) in LTE is used to convey the control information in uplink. PUCCH is usually located at the edge of the carrier as illustrated in FIG. 4. But if PUCCH over-dimensioning is enabled, PUCCH is configured toward the center of the carrier and some spectrum is reserved between PUCCH and the edge of the carrier.

RS and Control Channel from NR

Similar to LTE, an NR base station can transmit some signals in downlink to aid a UE to track its time and frequency synchronization and to measure the downlink channel quality. These signals are the Tracking Reference Signal (TRS) and the Channel State Information Reference Signal (CSI-RS). An NR UE may also be requested to transmit signals to enable the network to measure the uplink channel quality. These signals are called Sounding Reference Signal (SRS) in NR. The TRS bandwidth can have two values: the bandwidth part (BWP) bandwidth or 52 resource blocks if the system bandwidth is larger than that. A TRS bandwidth of 52 resource blocks seems to be sufficient, but CSI-RS and SRS need to span all the spectrum available to the NR scheduler in order to give as good performance as possible.

The channel to convey control information in downlink in NR is called PDCCH like for LTE. Different from LTE, PDCCH in NR is quite flexible, it can for example occupy just part of the carrier.

The channel to convey control information in uplink in NR is also called PUCCH. Different from LTE, PUCCH in NR is quite flexible, it can be located either at the edges of or within the carrier.

Dynamic Spectrum Sharing with LTE

To achieve wide coverage of NR, it is desirable that NR is deployed in low- and mid-band rather than in high-band. However, most of available low- and mid-band spectrum is already allocated to LTE that may be heavily loaded. In order not to affect LTE service, it is preferable that LTE and NR can share the available spectrum in a dynamic way. It is possible to operate an NR carrier and an LTE carrier in the same frequency band. Terminals connected to the LTE carrier are unaware of any potential NR transmission whereas terminals connected to the NR carrier can be configured to be aware of a potential overlap with an LTE carrier. The LTE CRS cannot be disabled; hence a downlink NR slot will not be empty even if there is no LTE traffic.

When LTE and NR use the same subcarrier spacing, i.e. 15 kHz, NR can provide signalling of the positions of the CRS to the NR UE, using at least the Radio Resource Control (RRC) parameters lte-CRS-ToMatchAround for the CRS positions and nrofCRS-Ports for the number of CRS ports 1, 2 or 4.

There are two spectrum sharing scenarios between LTE and NR. In low-band, where there is typically no new spectrum available for NR, NR must share the same carrier or spectrum with LTE. Usually the total available bandwidth that can be shared is less than or equal to 20 MHz. In mid-band, there is most often new spectrum available for NR, and for some operators, the allocated spectrum for NR includes both the new spectrum and the existing spectrum of LTE. The spectrum allocation for this case is shown in FIG. 5.

In this scenario, the total available spectrum for NR can be as large as 100 MHz if traffic load from LTE is low, and the available bandwidth can be as small as 20 MHz if traffic load from LTE is high.

In NR, a carrier Bandwidth Part (BWP) is a contiguous set of physical resource blocks, selected from a contiguous subset of the common resource blocks for a given numerology (u) on a given carrier. Maximum 4 BWP can be specified in DL and UL. Each BWP is configured by RRC messages as described in RRC Parameters for Bandwidth-Part Configuration. To adapt to NR bandwidth variation, one possible solution is to first configure UEs with up to four BWP, all with different bandwidths, and then use downlink control information (DCI) to switch BWP when the available bandwidth changes.

Another solution is to configure UEs with an initial bandwidth part being the same as the dedicated spectrum for NR where there is no LTE and then adapt to the available spectrum for NR at a certain point in time reconfiguring the bandwidth of the initial BWP either by intra-cell handover of all UEs in the cell or by UE-specific RRC reconfiguration for each UE.

The problem with the existing solution using reconfiguration of the initial bandwidth part is the signaling overhead for UE-specific RRC reconfiguration or for the intra-cell handover. Both solutions may cause a considerable delay for the bandwidth adaptation. Furthermore, the UE may complete the reconfiguration at slightly different times, which makes it complex for the network to keep track of the status of each UE.

The problem with the solution to use DCI to switch BWP is that it relies on an optional UE capability and therefore it is not clear that this solution can be used for all UEs.

SUMMARY

Therefore it is an object of embodiments herein to provide a method for improving spectrum sharing between LTE and NR in a wireless communication system.

According to a first aspect of embodiments herein, the object is achieved by a method performed in a network node for configuring UE with a dynamic spectrum sharing between a first Radio access technology (RAT) and a second RAT in a wireless communications system. The network node configures an initial bandwidth part, BWP, for a UE, spanning across a dedicated spectrum for the first RAT and a shared spectrum between the first and second RATs, wherein synchronization signals of the first RAT are configured in the dedicated spectrum, and at least some other signals of the first RAT are configured in both dedicated and shared spectrum. The first RAT may be NR and the second RAT may be LTE. In NR, PDCCH is transmitted within a set of resource blocks, named a CORESET. There may be several CORESETs configured for a UE. CORESET0 is signalled in the Master information block. The Synchronization Signal Block/Physical Broadcast Channel (SS/PBCH) block, the PDCCH set of resource blocks CORESET0 which is signaled in the Master information block, paging and system information of the first RAT may be configured in the dedicated spectrum. The CSI-RS for other purposes than tracking, other PDCCH sets of resource blocks CORESETs, PUCCH, TRS, and SRS of the first RAT may be configured in both dedicated and shared spectrum.

The proposed solution is to configure the bandwidth of initial BWP in System information block 1 (SIB1) to use the maximum available bandwidth for NR. That is, the bandwidth that is dedicated for NR plus the bandwidth that is shared between LTE and NR. NR channels or signals are split into two categories, those that need to be configured in NR dedicated spectrum, and those that may be configured in shared spectrum so that when the available resource for NR changes, it is not necessary to reconfigure UE with new or modified BWPs to utilize the new available bandwidth. No signaling is required at all when the available bandwidth changes. It is just scheduler responsibility to use the new available bandwidth.

The proposed solution allows for bandwidth adaptation for NR in a spectrum sharing scenario without any RRC signaling. Thus, signaling overhead is avoided and the bandwidth adaptation is very fast. Furthermore, no specific UE capabilities are required.

Therefore the proposed method facilitates dynamic spectrum sharing between LTE and NR communication networks with improved resource utilization efficiency and without any RRC signaling and specific UE capabilities.

BRIEF DESCRIPTION OF THE DRAWINGS

Examples of embodiments herein are described in more detail with reference to attached drawings in which:

FIG. 6 illustrating a wireless communication system in which embodiments herein may be implemented in;

FIG. 9 is a flow chart illustrating a method performed in a network node according embodiment herein.

DETAILED DESCRIPTION

Figure 1:
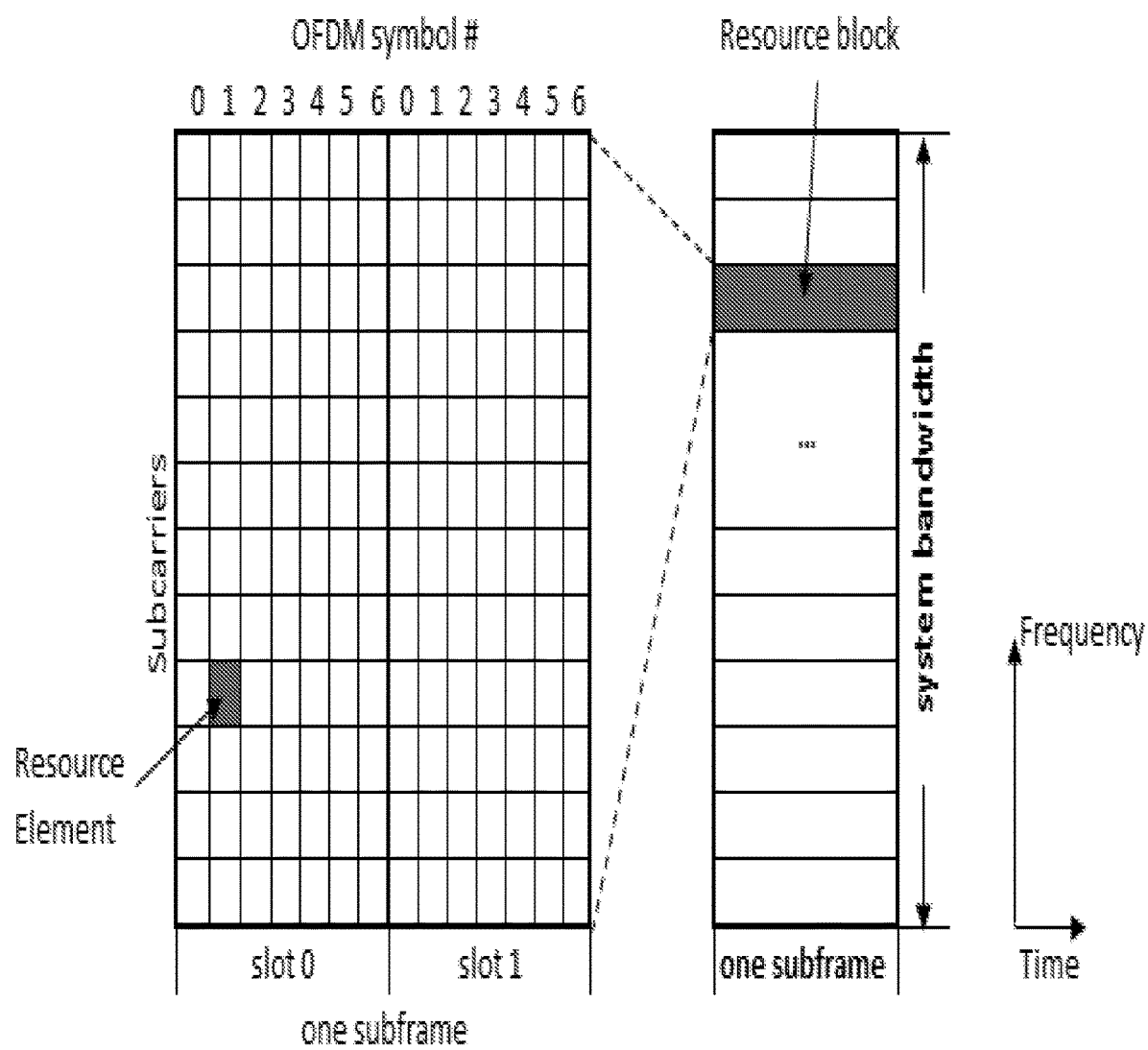
FIG. 1 illustrating LTE physical resources.
Figure 2:
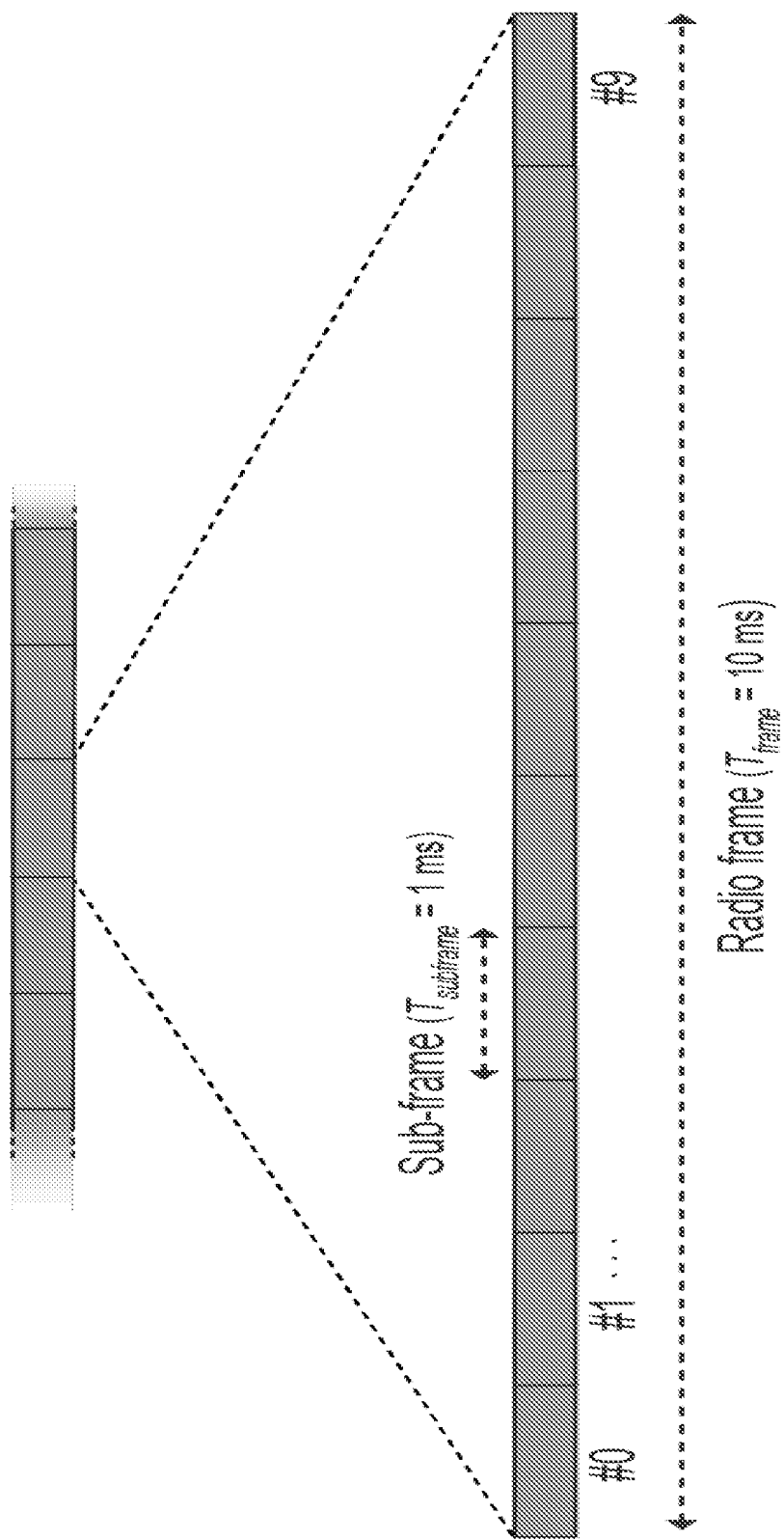
FIG. 2 illustrating LTE time-domain structure with 15 kHz subcarrier spacing.
Figure 3:
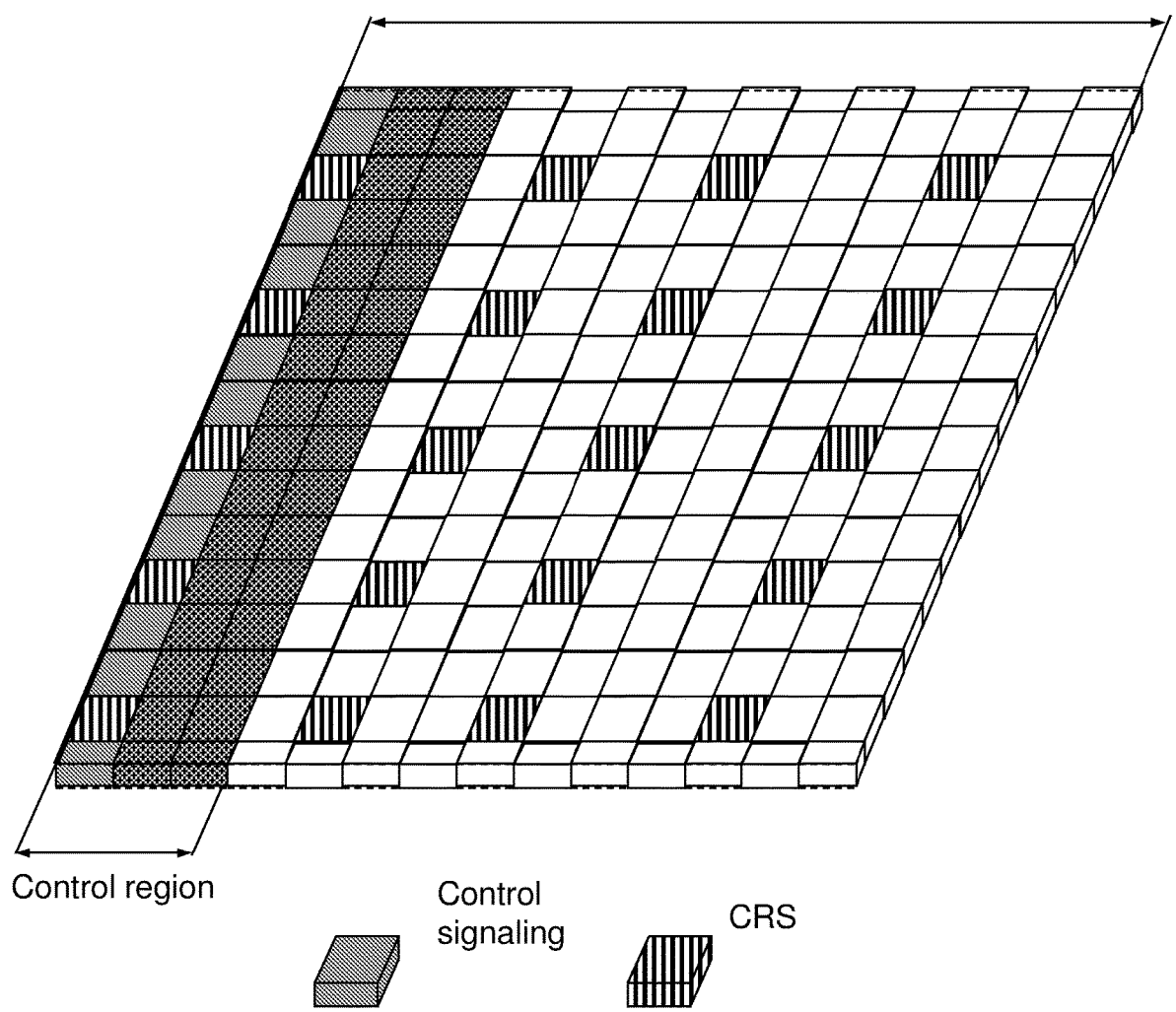
FIG. 3 illustrating LTE CRS positions.
Figure 4:
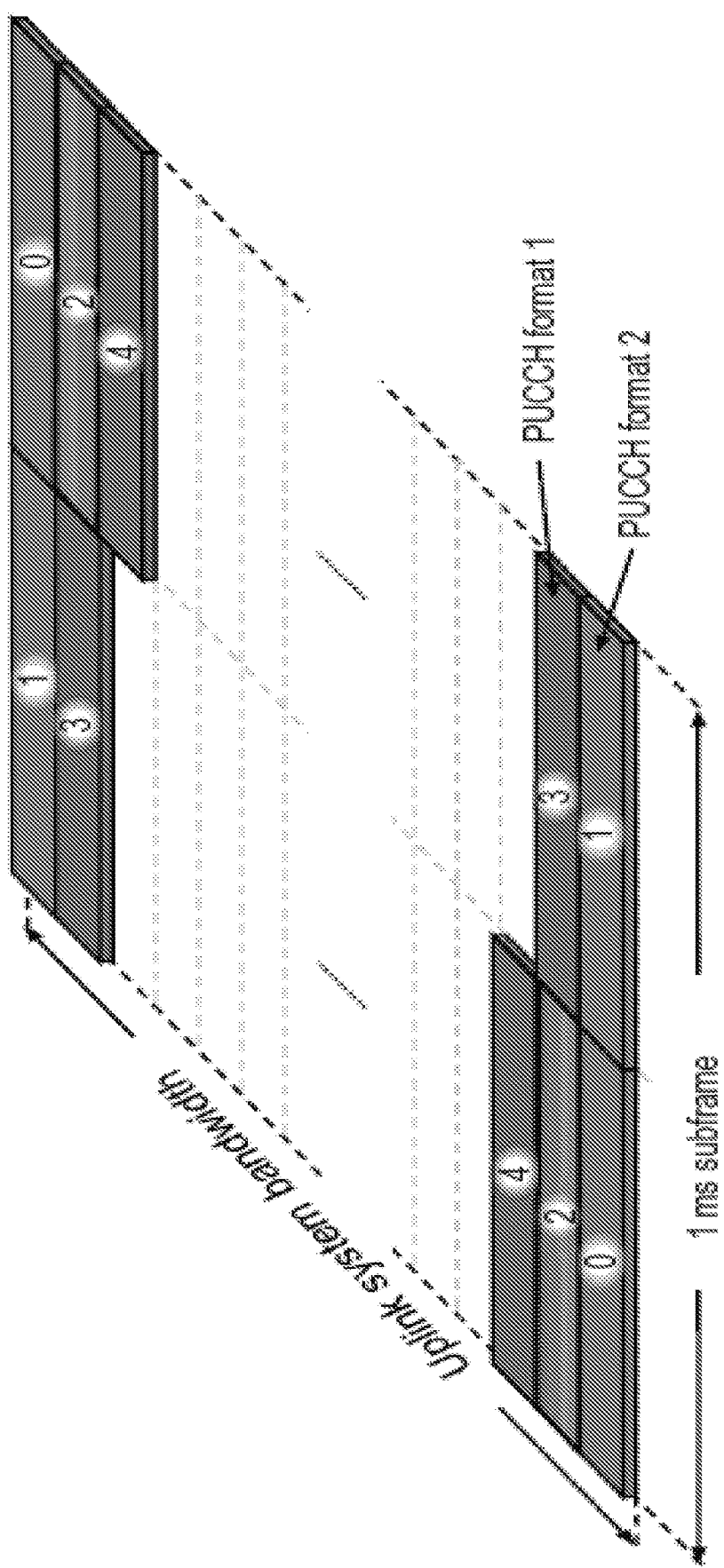
FIG. 4 illustrating PUCCH locations at a carrier.
Figure 5:
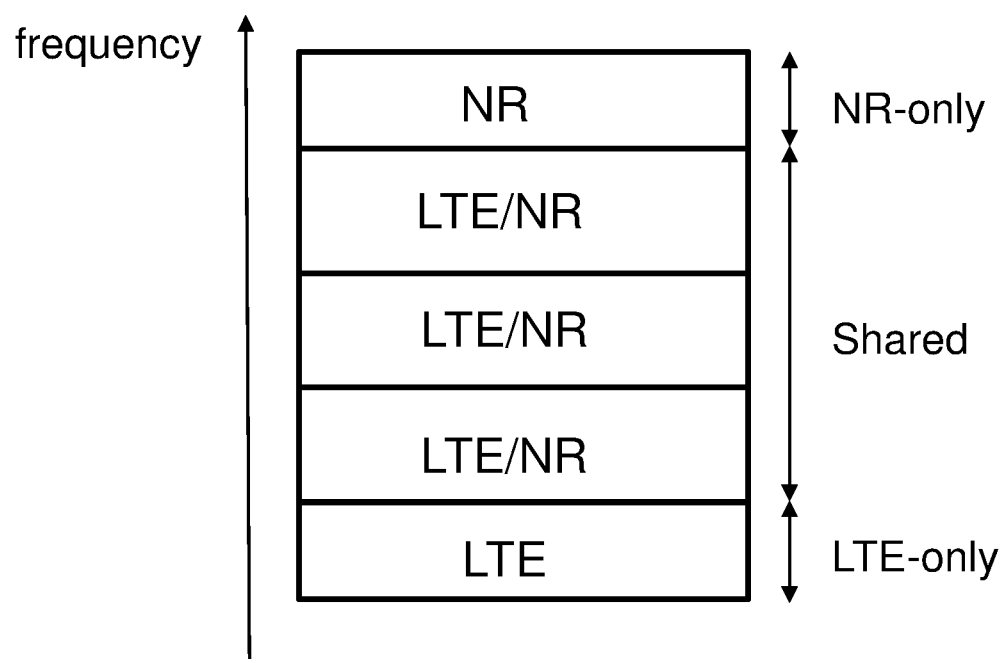
FIG. 5 illustrating spectrum allocation according to prior art.
Figure 6:
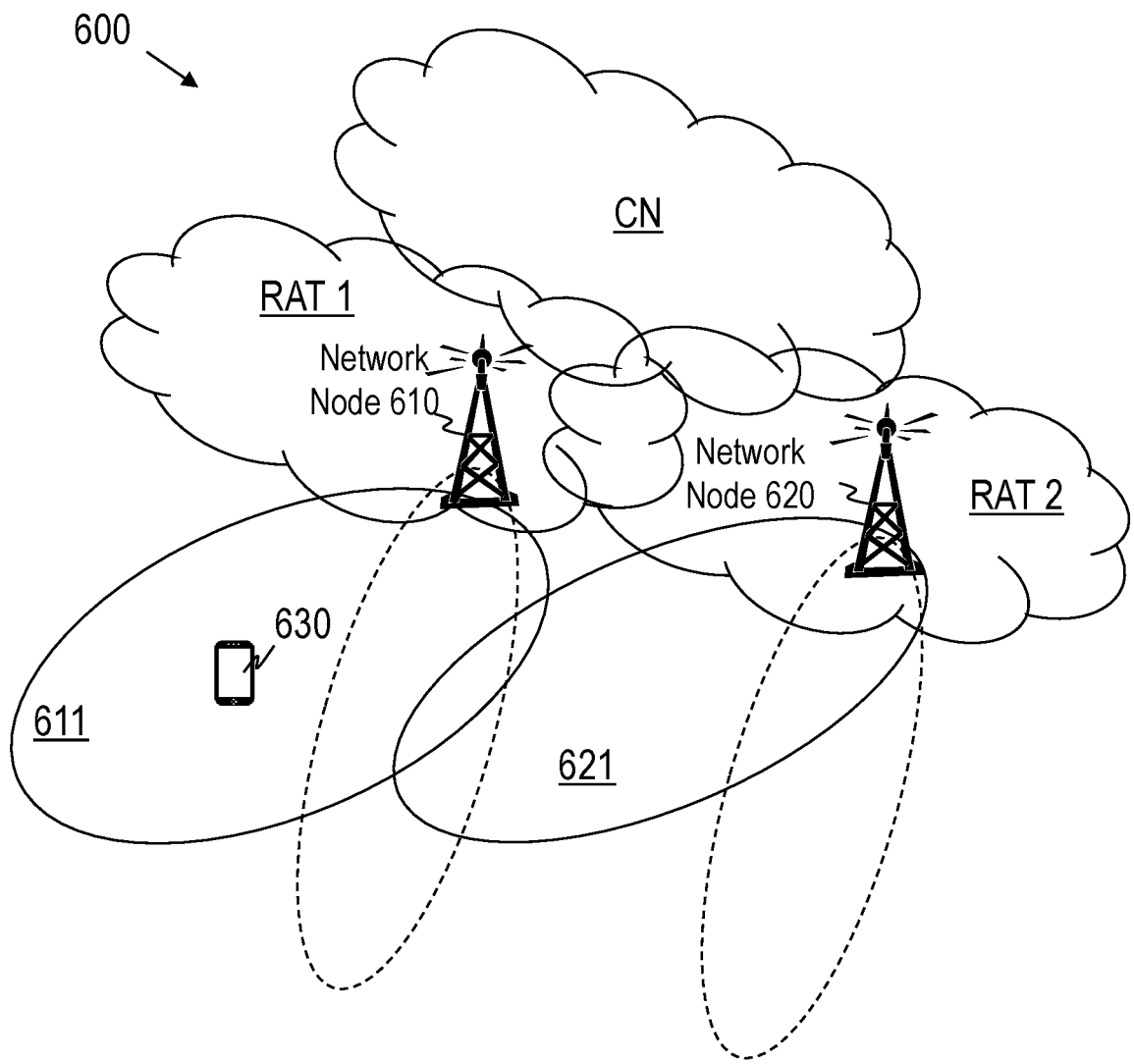

FIG. 6 is a schematic overview depicting a communication system 600 in which embodiments herein may be implemented. The communication system 600 may comprise any wireless system or cellular network, such as a Long Term Evolution (LTE) network, any 3$^{rd}$ Generation Partnership Project (3GPP) cellular network, a Fourth Generation (4G) network, a Fifth Generation (5G) or NR network etc.

In the wireless communication system 600, wireless communication devices e.g. a user equipment 630 such as a mobile station or terminal, a wireless terminals communicate via one or more Radio Access Technology e.g. RAT 1, RAT2 to one or more core networks (CN). It should be understood by the skilled in the art that "wireless communication device" is a non-limiting term which means any terminal, wireless communication terminal, user equipment, Machine Type Communication (MTC) device, Internet of Things (IoT) device, Device to Device (D2D) terminal, or any other network node e.g. smart phone, laptop, mobile phone, sensor, relay, mobile tablets or even a small base station communicating within a cell. The terms "user equipment", "UE" and "wireless communication device" are used interchangeable herein.

Network nodes operate in the wireless communication networks such as a first network node 610 and a second network node 620. The first network node 610 provides radio coverage over a geographical area, a cell area or a service area 611, which may also be referred to as a beam or a beam group where the group of beams is covering the service area of a first radio access technology RAT 1, such as 5G, LTE, LTE-M, Wi-Fi or similar. The second network node 620 provides radio coverage over a geographical area, a service area 621, which may also be referred to as a beam or a beam group where the group of beams is covering the service area of a second radio access technology RAT 2, such as 5G, LTE, LTE-M, Wi-Fi or similar. The service areas 611 and 621 for e.g. LTE and NR, may overlap at some area. The first and second network nodes 610, 620 may be referred as base station, eNB, gNB etc.

According to the embodiments herein, the network node 610 configures an initial BWP for a UE to be the union of NR-dedicated spectrum and spectrum shared with LTE. The available bandwidth for the NR scheduler may change due to the addition and removal of LTE cells. Signals that preferably cover the full bandwidth, such as CSI-RS, TRS, SRS, and PUCCH are not reconfigured when the available NR bandwidth changes. Other channels and messages, such as PDCCH, SS/PBCH block, paging and system information are only transmitted in the NR-dedicated spectrum so as not to collide with LTE signals.

Figure 7:
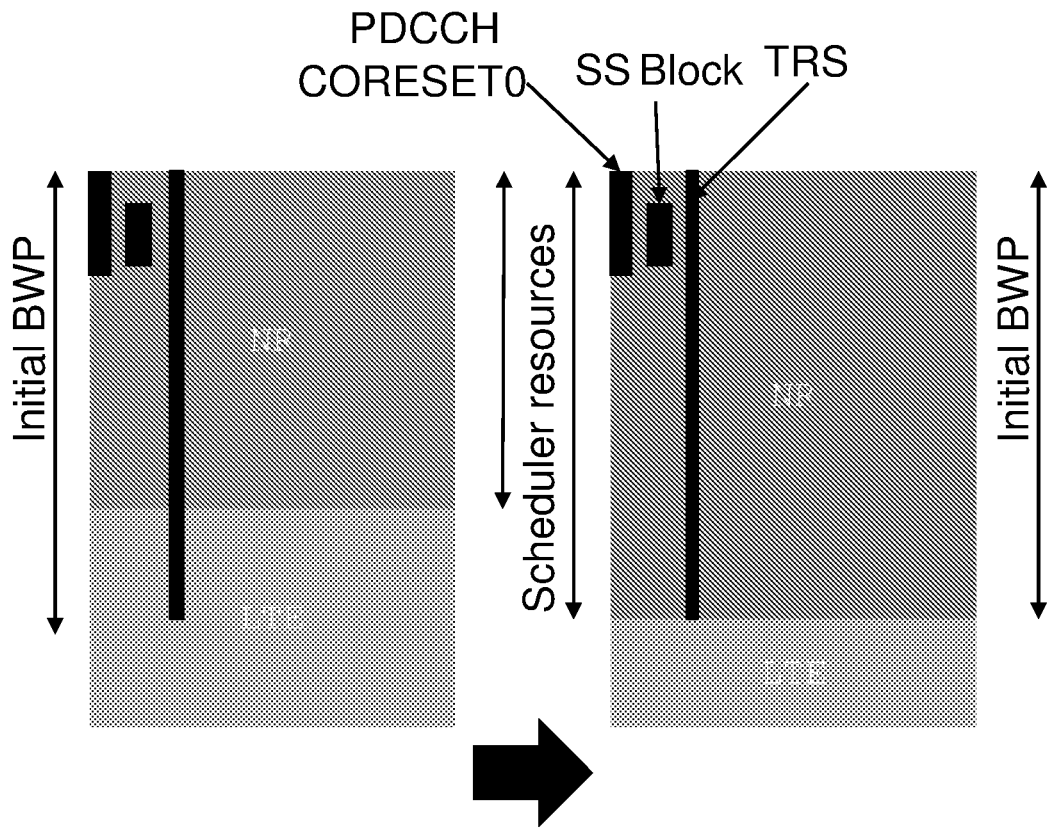
FIG. 7 illustrating downlink channel/signal configuration for NR for dynamic spectrum sharing according to embodiments herein.

The downlink channel/signal configuration for NR for dynamic spectrum sharing is shown in FIG. 7.

In the SIB1 message, the initial BWP is configured to the maximum possible available bandwidth, i.e. including the spectrum dedicated for NR and the spectrum shared with LTE.

The synchronization signal blocks are configured in NR-dedicated spectrum.

NR PDCCH is transmitted within a set of resource blocks, named a CORESET. There may be several CORESETs configured for a UE.

CORESET0 is signaled in the Master information block and shall be in the NR-dedicated spectrum. Other CORESETs carrying PDCCH may be configured in the shared spectrum.

CSI-RS for other purposes than tracking is configured in the maximum possible available bandwidth. In order to avoid collisions with LTE PDSCH and degradation of LTE PDSCH, NR CSI-RS may be configured in slots overlapping LTE MBSFN subframes. Alternatively, if collisions are acceptable, no MBSFN subframe needs to be configured. It has to be ensured NR CSI-RS don't collide with LTE CRS. CSI-RS can be transmitted e.g. every 10 or 20 ms. TRS can be handled in a similar way but may also be configured to span only a fraction of the available bandwidth, preferably within the dedicated NR spectrum. TRS occurs typically less frequent, e.g. every 40 or 80 ms.

Figure 8:
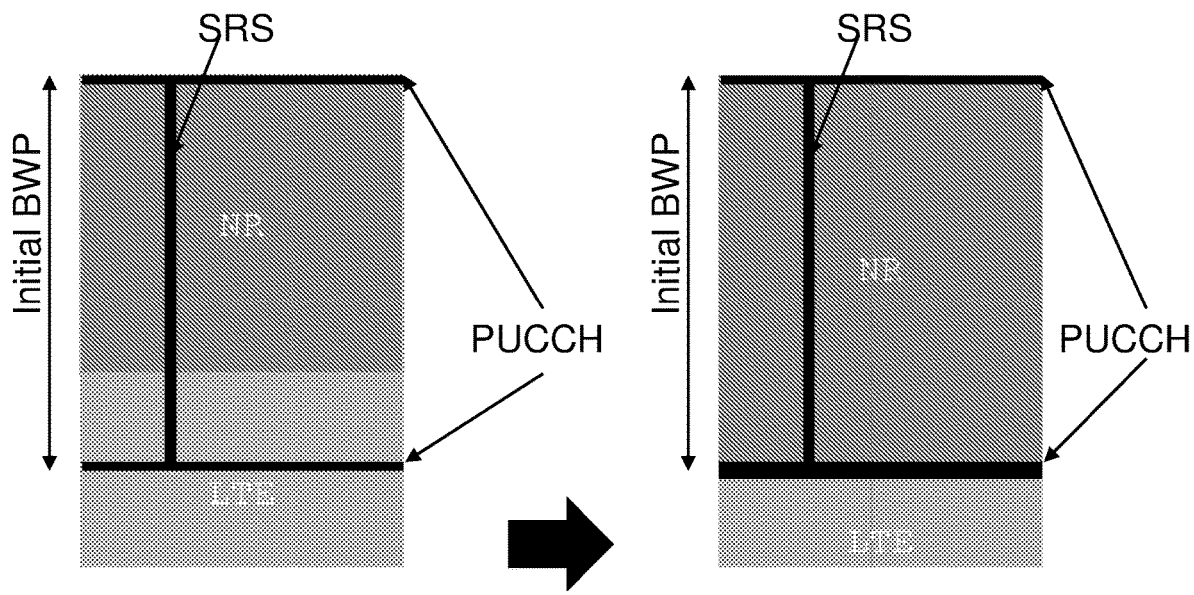
FIG. 8 illustrating uplink channel/signal configuration for NR for dynamic spectrum sharing according to embodiments herein

The uplink channel or signal configuration for NR in dynamic spectrum sharing is shown in FIG. 8.

From uplink perspective, if SRS is needed for NR, it is configured throughout the maximum possible available bandwidth as for CSI-RS in downlink. In order to avoid collision with an LTE PUSCH transmission, NR SRS may either be configured in an uplink symbol, i.e. in UpPTS in the special subframe of LTE where there is typically LTE SRS or be configured in the uplink symbol in an LTE normal uplink subframe where LTE UEs are configured with aperiodic SRS. LTE SRS is not configured in the same resources or not triggered where the NR SRS is configured to avoid collision between the NR SRS and LTE SRS.

NR PUCCH may be configured at the edges of the NR cell using resources in an LTE cell. Applying over-dimensioning to LTE PUCCH those uplink resources can be avoided by LTE. In this way, there is no fragmentation of the uplink spectrum for NR.

In this way, regardless of how much spectrum is available for NR, no RRC signalling is needed to inform each NR UE when the NR-available spectrum changes. The NR scheduler can thus handle the change of available bandwidth in a very fast way.

Above configurations work both for same numerology between NR and LTE and for different numerologies, e.g. LTE with 15 kHz and NR with 30 kHz sub-carrier spacing. In the latter case guard bands might need to be inserted in frequency between NR and LTE transmissions. Furthermore, resource elements that overlap with LTE CRS and likely resource elements in the frequency vicinity of LTE CRS resource elements, need to be rate matched around. NR provides a rate matching mechanism to exclude certain PRBs over a defined set of symbols from NR PDSCH i.e. rate match around. If NR is configured with 30 kHz sub-carrier spacing, two NR symbols overlap each LTE CRS symbol. A typical setup would be that for each LTE CRS symbol, the NR resource elements in the two NR symbols overlapping the LTE CRS symbol and being in the shared spectrum plus potentially some frequency guard are configured as unavailable.

A method performed in a network node 610, 620 for configuring a UE 630 with a dynamic spectrum sharing between a first RAT and a second RAT in a wireless communications system 600 will be described with reference to FIG. 9. The method comprises the following actions.

Action 910

The network node 610, 620 configures an initial bandwidth part (BWP) for a UE 630, spanning across a dedicated spectrum for the first RAT and a shared spectrum between the first and second RATs, wherein synchronization signals of the first RAT are configured in the dedicated spectrum, and at least some other signals of the first RAT are configured in both dedicated and shared spectrum.

The first RAT is NR and the second RAT is LTE.

According to some embodiments herein, SS/PBCH block, PDCCH set of resource blocks CORESET0 signaled in the MIB, paging signal and system information block of the first RAT may be configured in the dedicated spectrum.

According to some embodiments herein, CSI-RS for other purposes than tracking, other PDCCH set of resource blocks CORESETs, PUCCH, TRS, and SRS of the first RAT may be configured in both dedicated and shared spectrum. There is no reconfiguration of the above mentioned signals when the available bandwidth changes.

Figure 10:
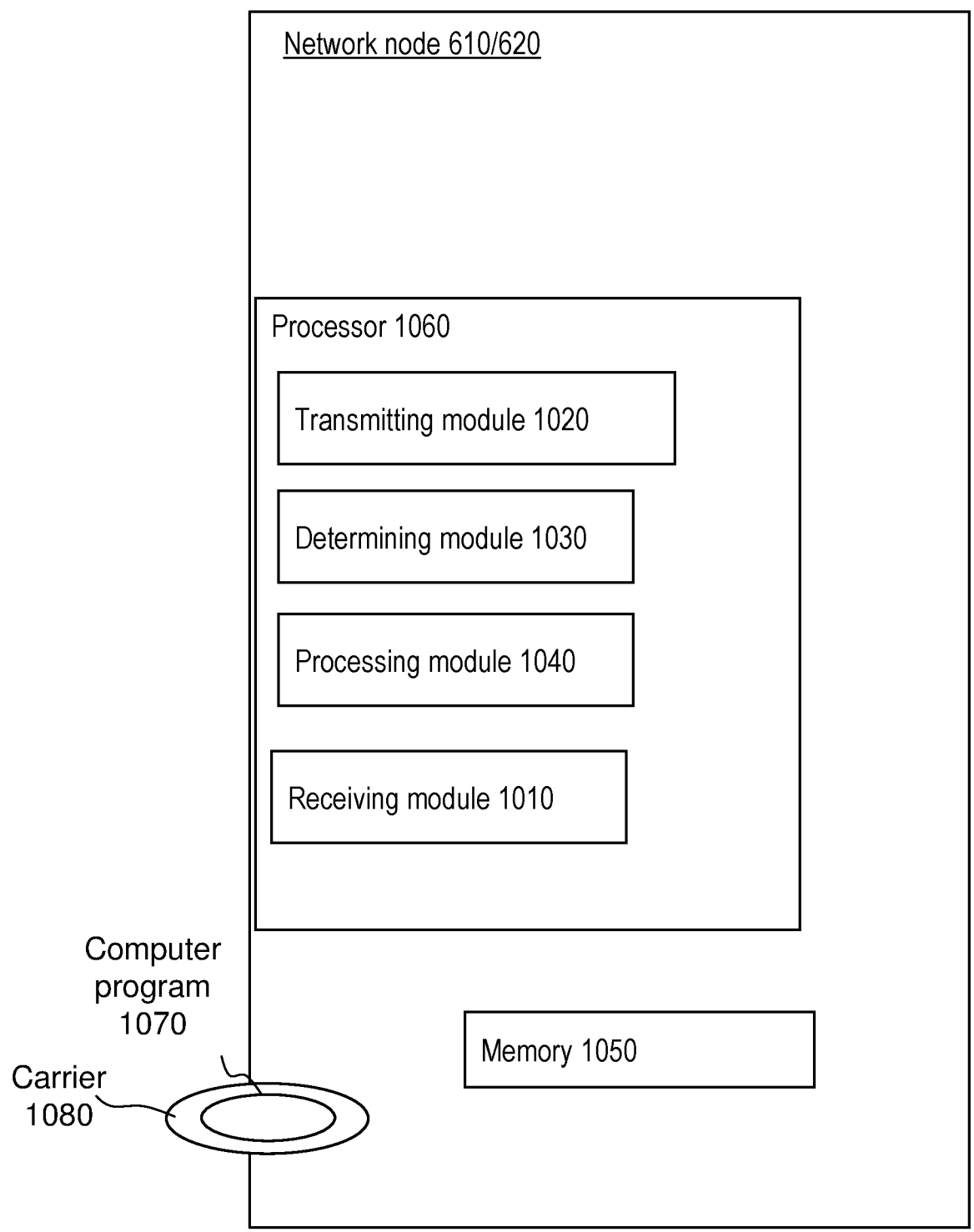
FIG. 10 is a schematic block diagram illustrating one embodiment of a network node.

To perform the method in the network node 610, 620, the network node comprises modules as shown in FIG. 10. The network node comprises a receiving module 1010, a transmitting module 1020, a determining module 1030, a processing module 1040, a memory 1050 etc. The receiving module 1010, transmitting module 1020, determining module 1030 and processing module 1040 may be combined as one module, shown as processor 1060.

The network node 610, 620 configures an initial bandwidth part (BWP) for a UE 630, spanning across a dedicated spectrum for the first RAT and a shared spectrum between the first and second RATs, wherein synchronization signals of the first RAT are configured in the dedicated spectrum, and at least some other signals of the first RAT are configured in both dedicated and shared spectrum.

The method according to embodiments herein may be implemented through one or more processors, such as the processor 1060 in the network node 610, 620 together with computer program code for performing the functions and actions of the embodiments herein. The program code mentioned above may also be provided as a computer program product, for instance in the form of a data carrier 1080 carrying computer program code 1070, as shown in FIG. 10, for performing the embodiments herein when being loaded into the network node 610, 620. One such carrier may be in the form of a CD ROM disc. It is however feasible with other data carriers such as a memory stick. The computer program code may furthermore be provided as pure program code on a server or a cloud and downloaded to the network node 610, 620.

The memory 1050 in the network node 610, 620 may comprise one or more memory units and may be arranged to be used to store received information, measurements, data, configurations and applications to perform the method herein when being executed in the network node 610, 620.

The invention claimed is:

1. A method performed in a network node for configuring a user equipment, UE, with dynamic spectrum sharing between a first Radio access technology, RAT, and a second RAT, in a wireless communications system, the method comprising:
configuring an initial bandwidth part, BWP, for the UE, spanning across a dedicated spectrum for the first RAT and a shared spectrum between the first and second RATs, wherein synchronization signals of the first RAT are configured in the dedicated spectrum, and at least some other signals of the first RAT are configured in both the dedicated and shared spectrum regardless of whether the shared spectrum is assigned to the first RAT or the second RAT.

2. The method of claim 1, wherein the initial BWP is configured to a maximum available bandwidth including both the dedicated spectrum dedicated for the first RAT and the shared spectrum shared with the second RAT.

3. The method of claim 1, wherein the first RAT is New Radio, NR, and the second RAT is Long Term Evolution, LTE.

4. The method of claim 2, wherein a Synchronization Signal/Physical Broadcast Channel, SS/PBCH block, a set of Physical downlink control channel, PDCCH, resource blocks which is signaled in a master information block, a paging signal, and a system information block of the first RAT are configured in the dedicated spectrum.

5. The method of claim 4, wherein for downlink of the first RAT, a Channel State Information Reference Signal, CSI-RS, for other purposes than tracking, other PDCCH sets of resource blocks, a Tracking Reference Signal, TRS, are configured in the maximum available bandwidth of both the dedicated and shared spectrum.

6. The method of claim 5, wherein the CSI-RS of the first RAT is configured in slots overlapping Multimedia Broadcast multicast Service Single Frequency Network, MBSFN, subframes of the second RAT.

7. The method of claim 5, wherein the Tracking Reference Signal, TRS, of the first RAT is configured to span a fraction of the maximum available bandwidth within the dedicated spectrum for the first RAT.

8. The method of claim 2, wherein for uplink of the first RAT, a Sounding Reference Signal, SRS, Physical uplink control channel, PUCCH, is configured in the maximum available bandwidth of both the dedicated and shared spectrum.

9. The method of claim 8, wherein the SRS PUCCH is configured at edges of the first RAT using resources in a cell of the second RAT.

10. A network node for configuring a user equipment, UE, with dynamic spectrum sharing between a first Radio access technology, RAT, and a second RAT, in a wireless communications system, the network node is configured to:
configure an initial bandwidth part, BWP, for the UE, spanning across a dedicated spectrum for the first RAT and a shared spectrum between the first and second RATs, wherein synchronization signals of the first RAT are configured in the dedicated spectrum, and at least some other signals of the first RAT are configured in both the dedicated and shared spectrum regardless of whether the shared spectrum is assigned to the first RAT or the second RAT.

11. The network node of claim 10, wherein the initial BWP is configured to a maximum available bandwidth including both the dedicated spectrum dedicated for the first RAT and the shared spectrum shared with the second RAT.

12. The network node of claim 10, wherein the first RAT is New Radio, NR, and the second RAT is Long Term Evolution, LTE.

13. The network node of claim 10, wherein a Synchronization Signal/Physical Broadcast Channel, SS/PBCH, block, a Physical downlink control channel, PDCCH, a set of PDCCH resource blocks which is signaled in a master information block, a paging signal, and a system information block of the first RAT are configured in the dedicated spectrum.

14. The network node of claim 13, wherein for downlink of the first RAT, a Channel State Information Reference Signal, CSI-RS, for other purposes than tracking, other PDCCH sets of resource blocks, a Tracking Reference Signal, TRS, are configured in a maximum possible available bandwidth of both the dedicated and shared spectrum.

15. The network node of claim 14, wherein the CSI-RS of the first RAT is configured in slots overlapping Multimedia Broadcast multicast Service Single Frequency Network, MBSFN, subframes of the second RAT.

* * * * *